US000001424H

United States Statutory Invention Registration [19]

[11] Reg. Number: H1424

Budde

[43] Published: Apr. 4, 1995

[54] TRANSDUCER GIMBAL STRUCTURE

[75] Inventor: Richard A. Budde, Minnetonka, Minn.

[73] Assignee: Hutchinson Technology Incorporated, Hutchinson, Minn.

[21] Appl. No.: 1,588

[22] Filed: Jan. 7, 1993

[51] Int. Cl.[6] ..... G11B 5/48

[52] U.S. Cl. ..... 360/104

[58] Field of Search ..... 360/104

[56] References Cited

U.S. PATENT DOCUMENTS

| | | | |
|---|---|---|---|
| 4,167,765 | 9/1979 | Watrous | 360/103 |
| 4,620,251 | 10/1986 | Gitzendanner | 360/103 |
| 4,786,999 | 11/1988 | Tanaka et al. | 360/104 |
| 4,868,694 | 9/1989 | Hagen | 360/104 |
| 4,954,919 | 9/1990 | Yamada | 360/104 |
| 5,172,286 | 12/1992 | Jurgenson | 360/104 |
| 5,198,945 | 3/1993 | Blaeser et al. | 360/104 |
| 5,225,950 | 7/1993 | Crane | 360/104 |

FOREIGN PATENT DOCUMENTS

| | | | |
|---|---|---|---|
| 1173679 | 9/1981 | Japan | 360/104 |
| 105860 | 7/1982 | Japan | 360/104 |
| 1-07384 | 4/1989 | Japan | 360/104 |
| 05542 | 4/1992 | WIPO | 360/104 |

OTHER PUBLICATIONS

Hutchinson Technology, "Type 16 Suspension Product Summary", Jul. 15, 1991, p. 7.

*Primary Examiner*—Bernarr E. Gregory
*Attorney, Agent, or Firm*—Faegre & Benson

[57] ABSTRACT

A magnetic head suspension 10 has a flexure portion 18 constituted as a single one-piece structure with a load beam spring element portion 12. The flexure portion 18 projects beyond a distal apex of the load beam spring element portion 12. The flexure portion 18 includes a first connection arm member connected at a proximal end thereof to the distal apex of the load beam spring element portion 12. Head support means are suspended from the first connection arm member. The head support means are constructed and arranged for supporting a head slider bonded to one face of a bond pad area 26 thereof. The head support means has a pair of substantially parallel flexible longitudinal arms 28 substantially enclosing the bond pad area 26. The distal end of the flexible arms 28 flexibly suspend the bond pad area 26 of the head support means. The proximal ends of the flexible arms 28 are connected to the distal end of the first connection arm member. A stiffening member 20, adhesively secured to the load beam element portion 12 adjacent the distal end thereof, projects over at least a portion of the flexure portion 18 and has a load protrusion 22 projecting from a surface thereof for engaging the opposite face of the bond pad area 26, thereby increasing vertical axis stiffness and providing a gimballing point for facilitating tracking of the slider over the surface of a disk.

22 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRANSDUCER GIMBAL STRUCTURE

BACKGROUND OF THE INVENTION

In a magnetic rigid disk storage device, a rotating disk is employed to store information in small magnetized domains strategically located on the disk surface. A large quantity of information can be manipulated in a small physical volume by providing timely and accurate access to these domains for the purposes of recording and retrieving information.

Typical construction of rigid disk storage device consists of a frame to provide attachment points and orientation for other components, a spindle capable of producing stable rotation of the rigid disk(s) upon which the information will be stored, a read/write transducer head capable of flying in close proximity to the rigid disk(s), thus enabling the creation of magnetic domains on the rigid disk, a suspension for orienting the transducer head and providing forces and compliances necessary for proper transducer operation, and an actuator for positioning the suspension and thus the read/-write transducer head or slider. Continued development of transducers/sliders has created the need for an improved combined gimbal and suspension design that will provide the necessary stiffnesses to allow the head to fly over the disks at the proper attitude for maximum read/write performance.

Conventionally available magnetic head gimbal designs for rigid disk drives allow magnetic read/write heads to pitch about a first axis and roll about a second axis orthogonal to the first axis when imperfections in the disk drive assembly tend to place the heads in improper positions relative to the surface of the disk. The present invention is designed to allow significant reductions in the pitch and roll axis stiffness of the head gimbal assembly, thus allowing the head to more readily maintain proper attitude. At the same time, the present invention is designed to increase the stiffness in the direction of the axis of actuation when compared to prior art designs which may have equivalently low pitch and roll stiffness.

Prior art gimbals of the type exhibited in U.S. Pat. Nos. 4,167,765 and 4,620,251, were all designed to provide acceptable pitch, roll, and lateral stiffness performance for a relatively crude level of slider performance which is rarely used in today's modern disk drive designs. Furthermore, said designs are not limited to but are most effective when the direction of actuation is coincident with the longitudinal axis of the gimbal and load beam. One solution to this problem can be seen in U.S. Pat. No. 4,868,694. Also, most current drive designs are not of this "linear" type but rather are classified as "rotary" due to actuation occurring orthogonal to the gimbal longitudinal axis. This motion is usually achieved by rotating the actuator and head gimbal assemblies about a common axis. This mode of actuation offers performance advantages in terms of data access time and economy of manufacture. Unfortunately, such prior art gimbals, especially when modified to lower their pitch and roll stiffness, also have reduced stiffness in the lateral direction and greater susceptibility to damage from shock loading.

Attempts at modifying prior art gimbals to function properly with newer slider designs have met with varying levels of success. Pitch and roll stiffness can be lowered by employing both thinner material and geometry changes but the reduction in lateral stiffness causes performance problems as indicated above.

SUMMARY OF THE INVENTION

The gimbal design of the present invention overcomes the limitations of the prior art by using geometric configurations and feature placement which produces significantly lower pitch and roll stiffness, maintains lateral stiffness, and eases the sensitivity to manufacturing tolerances.

It is an object of the present invention to provide an improved gimbal design for magnetic head suspension systems.

Another object of the present invention is to provide a gimbal which has significantly reduced pitch and roll stiffness compared to prior art gimbals.

A further object of the present invention is to provide a gimbal which maintains adequate levels of lateral stiffness while simultaneously achieving low pitch and roll stiffness.

Another object of the present invention is to perform the forming operations in an area remote from the gimbal, thereby improving the manufacturability of the present invention compared to the methods commonly used in prior art gimbals.

The present invention provides a magnetic head suspension for attachment to an actuator arm of a disk drive, said head suspension comprising, a load beam spring element portion joined to the arm at a proximal end thereof; a unitary flexure portion formed from the same sheet of material as the load beam spring element and projecting beyond a distal apex of the load beam spring element. The flexure portion includes a first connection arm member connected at a proximal end thereof to the distal apex of the load beam element, head support means suspended from the first connection arm means, said head support means constructed and arranged for supporting a disk drive head slider bonded to one face of a bond pad area thereof, and at least one slot cut into the surface of the head support means surrounding the bond pad area thereof to define a pair of substantially parallel flexible arms substantially enclosing the bond pad area, the flexible arms being aligned generally with the longitudinal axis of the load beam, each of the flexible arms being constructed and arranged for flexible suspension of the bond pad area of the head support means from the distal ends of the flexible arms, the proximal ends thereof being connected to the distal end of the first connection arm member; and a stiffening member adhesively secured to said load beam element adjacent the distal end thereof, said stiffening member projecting over at least a portion of the flexure portion and having a load protrusion projecting from a surface thereof for engaging the opposite face of the bond pad area thereby increasing vertical axis stiffness and providing a gimballing point for facilitating tracking of the slider over the surface of a disk.

An alternative form of the present invention provides a magnetic head suspension for attachment to a rigid arm, said head suspension comprising, in combination a load beam spring element portion joined to the arm at a proximal end thereof; a flexure portion, unitary with the load beam spring element portion, said flexure portion projecting beyond a distal apex of the load beam element, the flexure portion being divided into first connection arm member connected at one end to the distal apex of the load beam element and axially aligned with the longitudinal axis of the load beam, head support means suspended from the connection arm means, said head support means constructed and arranged for supporting a disk drive head slider bonded to one face of a bond pad area thereof, the bond pad area being divided into portions located on opposite sides of said first connection arm member, said bond pad areas being linked to the distal end of the first connection arm means and to each other adjacent the distal ends thereof by a second connection arm member; and a stiffening member adhesively secured to said load beam element adjacent the distal end thereof, said stiffening member projecting over at least a portion of the flexure portion and having a load protrusion projecting from a surface thereof for engaging the opposite face of the bond pad area thereby increasing vertical axis stiffness and a providing a gimballing point for facilitating tracking of a slider over the surface of a disk.

These and other objects of the present invention will be apparent with reference to the drawings, the description of the preferred embodiment, and the claims.

DETAILED DESCRIPTION OF THE INVENTION

Figure 1A:
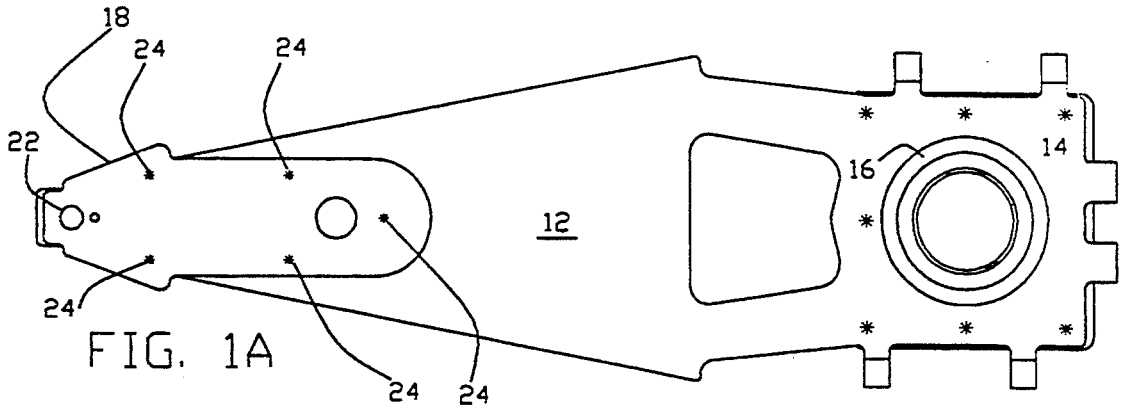
FIG. 1A is a top plan view and FIG. 1B is a bottom plan view of one embodiment of a suspension assembly in accordance with the present invention.
Figure 1B:
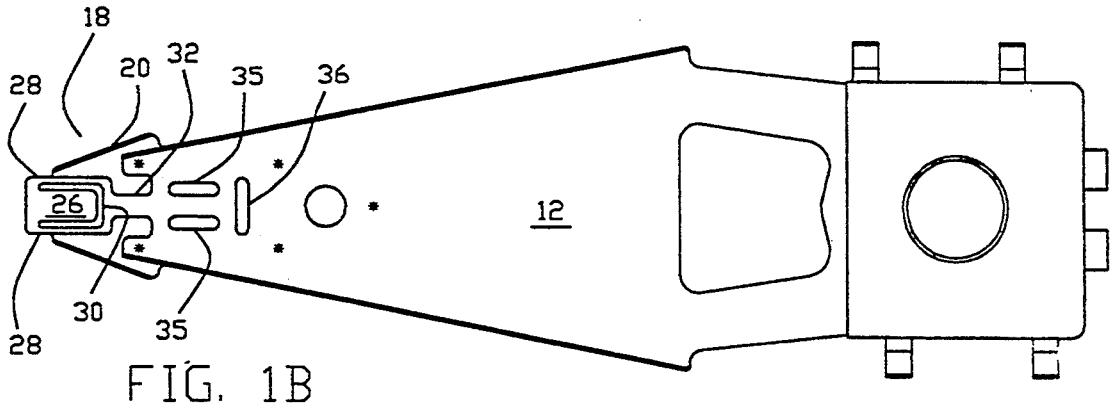

The improved magnetic head suspension for attachment to an actuator arm of a disk drive is illustrated in FIGS. 1A and 1B. A load beam spring element portion 12 is constructed and arranged for connection of its proximal end 14 to an actuating arm (not shown) of a disk drive. In the embodiment shown in FIGS. 1A and 1B the proximal end 14 is connected to the actuating arm using a swaging technique which forces the outer circumference of a swaging boss 16 into a tight connection with the actuating arm or of the inner circumference of an interlocking boss as disclosed in a commonly assigned copending application Ser. No. 07/542,423, filed June 22, 1990, now U.S. Pat. No. 5,198,945, issued Mar. 30, 1993. Alternatively load beam 12 can be secured to the arm using bolts, any other commonly used attachment means or the attachment means illustrated in FIGS. 7 and 8 of commonly assigned application Ser. No. 07/612,012 filed November 9, 1990, now U.S. Pat. No. 5,198,945, issued Mar. 30, 1993.

In the preferred embodiments of the invention shown in FIGS. 1 through 9 herein a flexure or gimbal portion 18 of the suspension is an integral structure with the load beam 12 rather than being produced as a separate structure which is subsequently attached to the load beam as shown in the prior art Watrous U.S. Pat. No. 3,931,631 and similar patents. A stiffening member or plate 20 is adhesively secured, by welding or use of suitable bonding material, to the load beam spring element 12 adjacent its distal end. A load protrusion or dimple 22 is provided on the surface of plate 20 which faces the gimbal 18 to engage a surface of the tongue portion of gimbal 18 to increase the vertical axis stiffness of the gimbal 18 and provide a well defined gimballing point for facilitating the tracking of a magnetic sensor or slider over the surface of a disk.

In the embodiment shown in FIG. 1, load protrusion 22 is a "dimple" applied to the surface of the sheet material of the stiffener although the protrusion may alternatively be formed by a number of other means. Also, in the preferred embodiment shown, stiffener 20 is adhesively secured to load beam spring 12 by a plurality of laser welds 24 although other bonding or permanent attachment methods could be alternatively employed.

Referring now to the flexure portion 18 of FIG. 1B, a bond pad area 26 forms a tongue portion of a head support portion of flexure portion 18. The bond pad area 26 is substantially enclosed by a pair of flexible arms 28 which are defined from the remainder of the bond pad area by a slot 30 cut into the surface of the head support portion of flexure 18. Arms 28 flexibly suspend the bond pad area 26 of the head support means from their distal ends. The area between the arms 28 at the distal end of the flexure 18 constitutes a first transverse linking member suspending the bond pad area 26 therefrom.

The proximal ends of arms 28 are connected to a distal end of connection arm member or neck 32 which is connected at its proximal end to the distal apex of load beam portion 12. Again, with the exception of the separate stiffener 20, all of the portions of the load beam and flexure are formed from a unitary sheet of material.

Figure 2:
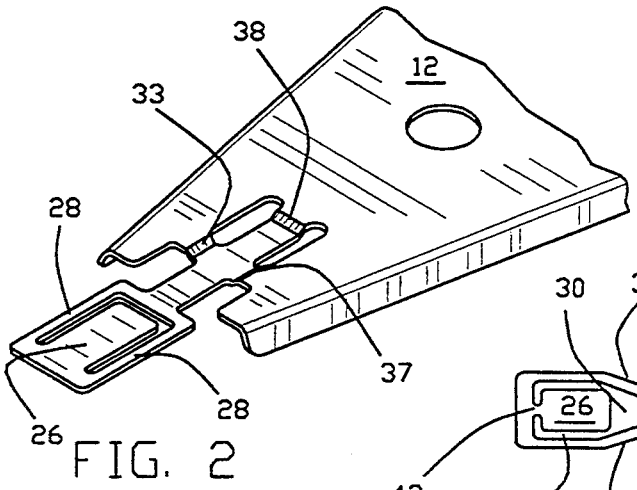
FIG. 2 is a detail view of the gimbal portion of a suspension as shown in FIG. 1.

In the vicinity of the apex of the load beam portion 12, there are several slots 34, 35 and 36 which are positioned to facilitate forming of the distal portion of the load beam 12 to offset the plane of the flexure 18 from that of the loadbeam as described below in more detail with respect to the embodiments of the invention illustrated in FIGS. 2, 8 and 9. For example FIG. 2 is a detailed view of the distal end of a suspension much like the one illustrated in FIG. 1 with like elements similarly numbered. Forming slot 36 has been omitted and the dashed lines 33, 37 and 38 denote forming lines resulting from a forming operation carried out to lower the plane of the connection arm and head support means below the plane of the remainder of the head suspension and load beam spring 12.

Figure 3:
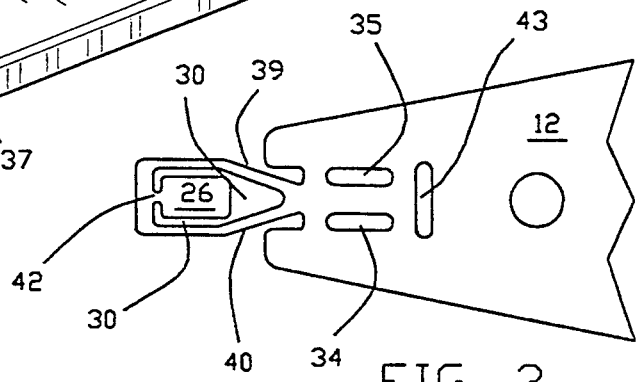
FIG. 3 is a detail view of the gimbal portion of an alternative embodiment of the invention.

In FIG. 3, a detailed view is presented of an alternative gimbal structure where connection arm or neck member 32 of FIG. 1B has been replaced with a pair of v-connected arms 39 and 40 which have the effect of reducing further the pitch and roll stiffness of the suspension. In the FIG. 3 embodiment, the slot 30 is additionally extended around the perimeter of the bond pad area 26 to leave a second connection arm member 42 which also provides softer pitch and roll stiffness than the embodiment shown in FIGS. 1 and 2. Additionally, the FIG. 3 embodiment of the invention includes a transverse slot 43 to facilitate the forming operation which is carried out for the purpose of offsetting the plane of the gimbal bond pad 26 from the plane of the remainder of the load beam 12.

Figure 4:
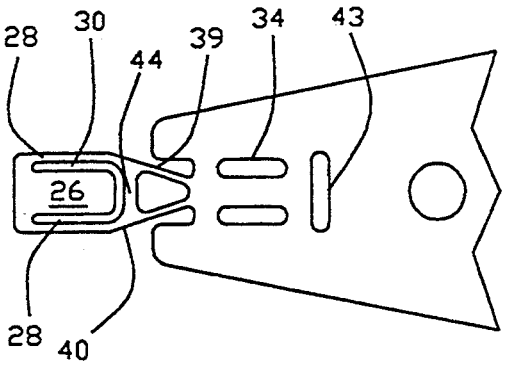
FIG. 4 is a detail view of the gimbal portion of another alternative embodiment of the invention.

In FIG. 4, another alternative embodiment of the gimbal structure is shown. In this embodiment, the bond pad area 26 is suspended from flexible arms 28 in the same manner as in the embodiment illustrated in FIG. 2 and the separated arms 39 and 40 which function as the connection arm are linked by a single cross arm or second transverse member 44 for an increase in lateral stiffness of the suspension.

Figure 5:
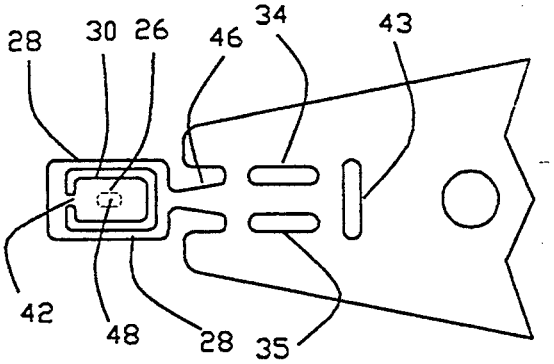
FIG. 5 is a detail view of the gimbal portion of still another alternative embodiment of the invention.

In FIG. 5 still another embodiment of the invention is shown with the bond pad area 26 suspended with the second connection arm member 42 to decrease the roll and pitch stiffness of the flexure. The head support means is joined to the apex of the load beam 12 by a first connection arm member 46 which is tapered from its junction with the distal apex of the load beam to its connection to the head support means. In this embodiment the outer flexible arms 28 are partially etched to reduce their thickness from that of the sheet material from which the load beam 12 and gimbal structure 18 was manufactured. In the preferred embodiment of the invention, the thickness of the sheet material is reduced by partial etching from a typical thickness of 0.003 inch to as little as 0.001 through 0.0015 inch, again to reduce further the gimballing stiffness of the suspension structure. Typically the transition from the partially etched portion of the structure to the parts left unetched or etched less than that of the thinned parts is a stepped transition so that the change in thickness of the suspension occurs in a relatively short distance. In addition to etching selected portions of the gimbal structure 18 thereby to reduce stiffness, the etching process may also be used in some embodiments of the invention to selectively reduce the thickness of at least a portion of the surface of the bond pad 26 to form a pocket 48 for receiving an appropriate quantity of adhesive material to facilitate the bonding of the slider to the bond pad.

Figure 6:
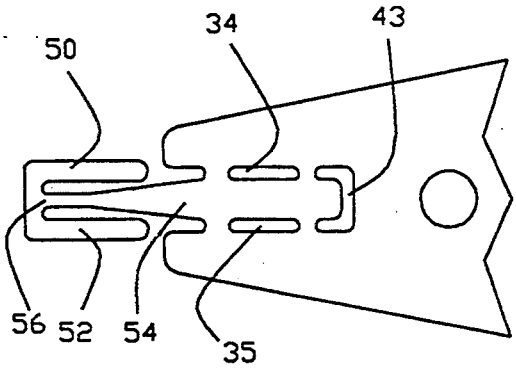
FIG. 6 is a detail view of the gimbal portion of yet another alternative embodiment of the invention.

In FIG. 6 details of yet another alternative embodiment of the invention are shown. In this embodiment, the transverse slot 43 shown in FIG. 4 has been modified by elongating the slot 43 used to create it so that the ends are aligned with the axis of the load beam 12 and the other slots 34 and 35 used for facilitating the forming operation. The bond pad area 26 of the previously discussed embodiments is separated into a pair of bond pad areas 50 and 52 which are located on opposite sides of an elongated connection arm member 54 and which is attached to the distal end of connection arm member 54 by an interconnecting second connection arm member 56. As may be seen in FIG. 6, connection arm member 54 is tapered from its proximal end joined to the distal apex of load beam spring 12 to a minimum width adjacent its junction with the second connection arm member 56. This version of the suspension again accomplishes the objective of providing adequate stiffness without unnecessarily degrading the pitch and roll performance.

Figure 7:
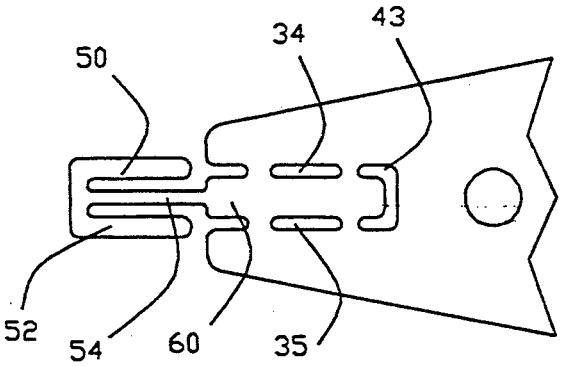
FIG. 7 is a detail view of the gimbal portion of a further alternative embodiment of the invention.

In FIG. 7 there is shown a further alternative embodiment of the gimbal portion 18 of the invention wherein the connection arm member 54 has a constant width over the majority of its length. At least a portion 60 of the length of the connection arm member 54 may be stepped to a larger width as shown in FIG. 7 wherein the region of the proximal end 60 of the connection arm is wider than the remainder of the arm 54. Again, the narrow portion of connection arm member 54 may be partially etched to reduce its thickness as well as its width to maintain good roll stiffness on a gimbal assembly 18 with high flexibility in pitch.

Figure 8:
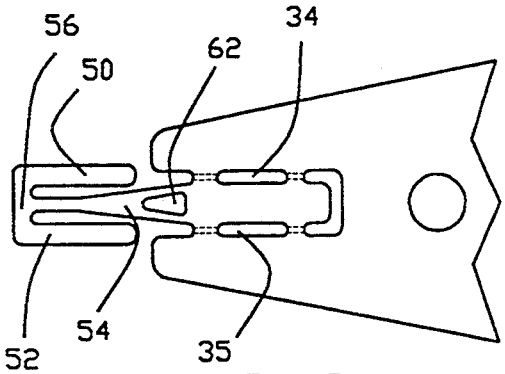
FIG. 8 is a detail view of the gimbal portion of a still further alternative embodiment of the invention.

In FIG. 8 a still further alternative gimbal design is shown. The configuration is quite similar to that of FIG. 6 with the exception that the wider portions of the connection arm member 54 have a cut-out aperture 62 in them to offer additional control of pitch and roll axis flexibility.

Figure 9:
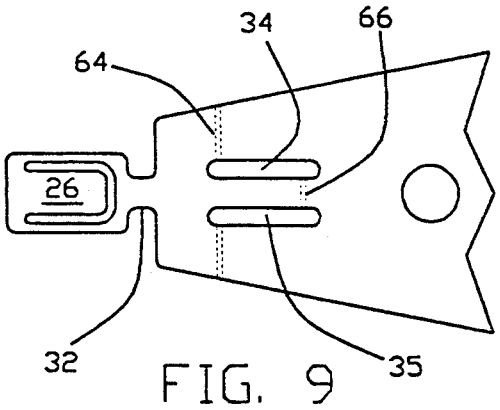
FIG. 9 is a detail view of the gimbal portion of an additional alternative embodiment of the invention.

Finally, in FIG. 9 there is shown a version of the gimbal quite similar to the one shown in FIG. 1B wherein the lateral forming assist slot 36 is omitted and the forming lines 64 and 66 are applied transversely to the axis of the suspension and perpendicular to the slots 34 and 35 rather than collinear with the slots.

The present invention has been described with reference to various embodiments thereof. This description of the invention will enable those skilled in the art to visualize yet other embodiments of the invention. Thus the scope and content of the invention is to be limited only by the scope and content of the following claims.

What is claimed is:

1. A magnetic head suspension for attachment to an actuator arm of a disk drive, said head suspension comprising, in combination:

(a) a load beam spring element portion joined to a distal end of the arm;

(b) a unitary flexure portion constituted as a single one-piece structure with the load beam spring element portion and projecting beyond a distal apex of the load beam spring element portion, the flexure portion being comprised of a first connection arm member connected at a proximal end thereof to the distal apex of the load beam spring element portion, head support means suspended from the first connection arm member, said head support means constructed and arranged for supporting a disk drive head slider bonded to one face of a bond pad area thereof;

at least one slot cut into a surface of the head support means surrounding the bond pad area thereof to define a pair of substantially parallel flexible arms substantially enclosing the bond pad area, the flexible arms being aligned generally with a longitudinal axis of the load beam spring element, each of the flexible arms being constructed and arranged for flexible suspension of the bond pad area of the head support means from distal ends of the flexible arms, proximal ends of the flexible arms being connected to a distal end of the first connection arm member;

such that a sole connection of the flexure portion to the load beam spring element portion is generally along a longitudinal axis of symmetry of the head suspension; and (c) a stiffening member adhesively secured to said load beam spring element portion adjacent the distal apex thereof, said stiffening member projecting over at least part of the flexure portion and having a load protrusion projecting from a surface thereof for engaging an opposite face of the bond pad area thereby increasing vertical axis stiffness and providing a gimballing point for facilitating tracking of the slider over the surface of a disk.

2. The invention of claim 1 wherein the bond pad area of a head support means is suspended at the distal end of the head support means from a first transverse linking member connecting the distal ends of the flexible arms.

3. The invention of claim 2 wherein the bond pad area of the head support means is connected to the first transverse linking member by a second connection arm member.

4. The invention of claim 1 wherein a width of the flexure portion is substantially less than a width of the distal apex of the load beam spring element portion.

5. The invention of claim 1 wherein the first connection arm member is tapered from a maximum width at the distal end of the load beam spring element portion to a minimum width at a proximal end of the head support means.

6. The invention of claim 1 wherein the first connection arm member has a maximum width which is substantially less than a width of the flexure portion at the distal apex of the load beam spring element portion.

7. The invention of claim 1 wherein a plane of the bond pad area of the flexure portion is substantially parallel to and displaced from a plane of the load beam spring element portion along form lines adjacent the distal apex of the load beam spring element portion.

8. The invention of claim 7 wherein material is removed from the load beam spring element portion along at least part of the form lines.

9. The invention of claim 7 wherein material is removed from the load beam spring element portion to form slots oriented transverse to at least a portion of the form lines.

10. The invention of claim 1 wherein the first connection arm member has a portion of its central area removed to provide a pair of connection arms linked at their distal ends by a second transverse linking member substantially perpendicular to the flexible arms thereby maintaining lateral stiffness of the suspension while minimizing its gimballing stiffness to allow improved tracking of a magnetic head mounted on the bond pad area.

11. The invention of claim 1 wherein the first connection arm member has a portion of its central area removed to provide a pair of connection arms each of which is directly linked at its distal extremity to one of said flexible arms without connection to each other except at the proximal ends thereof thereby maintaining lateral stiffness of the suspension while minimizing its gimballing stiffness to allow improved tracking of a magnetic head mounted on the bond pad area.

12. The invention of claim 1 wherein the bond pad area has an area of reduced surface thickness on a face to be bonded to a disk drive head slider thereby providing a reservoir for receiving adhesive to provide a stronger bond between the bond pad area and slider.

13. The invention of claim 1 wherein the first connection arm member is partially etched to reduce its thickness and increase pitch and roll axis flexibility of the suspension.

14. The invention of claim 1 wherein the flexible arms are partially etched to reduce their thickness and increase the pitch and roll axis flexibility of the suspension.

15. A magnetic head suspension for attachment to a rigid arm, said head suspension comprising, in combination:

(a) a load beam spring element portion joined to a distal end of the arm;

(b) a flexure portion, constituted as a single one-piece structure with the load beam spring element portion, said flexure portion projecting beyond a distal apex of the load beam spring element portion, the flexure portion being divided into first connection arm member connected at one end to the distal apex of the load beam spring element portion and axially aligned with a longitudinal axis of the load beam spring element portion, head support means suspended from the connection arm member, said head support means constructed and arranged for supporting a disk drive head slider bonded to one face of a bond pad area thereof, the bond pad area being divided into segments located on opposite sides of said first connection arm member, said bond pad areas being linked to a distal end of the first connection arm member and to each other adjacent the distal ends thereof by a second connection arm member;

such that sole connection of the flexure portion to the load beam spring element portion is generally along a longitudinal axis of symmetry of the head suspension; and (c) a stiffening member adhesively secured to said load beam spring element portion adjacent the distal end thereof, said stiffening member projecting over at least part of the flexure portion and having a load protrusion projecting from a surface thereof for engaging an opposite face of the connection arm member thereby increasing vertical axis stiffness and providing a gimballing point for facilitating tracking of a slider over a surface of a disk.

16. The invention of claim 15 wherein a width of the first connection arm member tapers from maximum width adjacent the distal apex of the load beam spring element portion to a minimum width adjacent its junction with the second connection arm member.

17. The invention of claim 15 wherein the first connection arm member is partially etched to reduce its thickness.

18. The invention of claim 17 wherein the first connection arm member is separated into a pair of connection arms by an aperture cut into the first connection arm member, thereby maintaining lateral stiffness of the suspension while reducing its gimballing stiffness.

19. The invention of claim 18 wherein the first connection arm member is partially etched to reduce its thickness.

20. The invention of claim 15 wherein a plane of the bond pad area of the flexure portion is substantially parallel to and displaced from a plane of the load beam spring element portion along form lines adjacent the distal apex of the load beam spring element portion.

21. The invention of claim 20 wherein material is removed from the load beam spring element portion along at least part of the form lines.

22. The invention of claim 20 wherein material is removed from the load beam spring element portion to form slots oriented transverse to at least part of the form lines.

* * * * *